US007596554B2

(12) United States Patent
Da Palma et al.

(10) Patent No.: US 7,596,554 B2
(45) Date of Patent: Sep. 29, 2009

(54) SYSTEM AND METHOD FOR GENERATING A UNIQUE, FILE SYSTEM INDEPENDENT KEY FROM A URI (UNIVERSAL RESOURCE INDENTIFIER) FOR USE IN AN INDEX-LESS VOICEXML BROWSER CACHING MECHANISM

(75) Inventors: William V. Da Palma, Coconut Creek, FL (US); Brett J. Gavagni, Coconut Creek, FL (US); Matthew W. Hartley, Boynton Beach, FL (US); Brien H. Muschett, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 10/731,458

(22) Filed: Dec. 9, 2003

(65) Prior Publication Data

US 2005/0125372 A1    Jun. 9, 2005

(51) Int. Cl.
 *G06F 17/30* (2006.01)
(52) U.S. Cl. .............................. 707/4; 709/218; 707/10
(58) Field of Classification Search .................... 707/1, 707/10, 203; 709/218
See application file for complete search history.

(56) References Cited

U.S. PATENT DOCUMENTS

| 6,029,175 | A | * | 2/2000 | Chow et al. ................. | 707/104 |
| 6,085,193 | A | * | 7/2000 | Malkin et al. ................ | 707/10 |
| 6,119,153 | A | * | 9/2000 | Dujari et al. ................ | 709/218 |
| 6,154,742 | A | * | 11/2000 | Herriot ........................ | 707/10 |
| 6,289,358 | B1 | * | 9/2001 | Mattis et al. ................ | 707/203 |

FOREIGN PATENT DOCUMENTS

| JP | 5227288 A | 9/1993 |
| JP | 2002007414 A | 11/2002 |
| WO | WO0217079 A2 | 2/2002 |

OTHER PUBLICATIONS

Mecozzi, D., et al., *Design for a transparent, Distributed File System*, pp. 77-84, CH30359-5/91/0000/0077, IEEE, 1991, Lawrence Livermore National Laboratory, Livermore, CA.
Mourad, A., et al., *Scalable Web Server Architectures*, pp. 12-16, 0-8186-785206/97, IEEE, 1997.
De Vos, A., et al., *XML For Model Exchange*, pp. 31-37, 0-7803-6681-6/01, IEEE, 2001.
Gennaro, R., et al., *Secure Key Recovery*, pp. ii-28, IBM Cryptography Center of Competence, IBM Thomas J. Watson Research Center.

* cited by examiner

*Primary Examiner*—Sathyanarayan Pannala
(74) *Attorney, Agent, or Firm*—Richard A. Tomlin, Esq.

(57) ABSTRACT

A method and system of storing and accessing documents on a computer file system utilizing a file system-independent key for use in an index-less browser caching mechanism. The present invention is a method and system for storing a resource such as a document or group of documents on a computer file system using a Universal Resource Indicator (URI) as the file name by generating a unique system-independent key from the URI for use in an index-less browser caching system. The invention takes into account the various file entry length limitations enforced by each unique file system by converting the specified URI into a key containing hexadecimal values of the key's characteristics. In this fashion, an index-less browser caching system such as a Web browser of a VoiceXML browser is created that is file system-independent.

15 Claims, 2 Drawing Sheets

SYSTEM AND METHOD FOR GENERATING A UNIQUE, FILE SYSTEM INDEPENDENT KEY FROM A URI (UNIVERSAL RESOURCE INDENTIFIER) FOR USE IN AN INDEX-LESS VOICEXML BROWSER CACHING MECHANISM

BACKGROUND OF THE INVENTION

1. Statement of the Technical Field

The present invention relates to the field of document storage systems and more particularly to a method and system of accessing and storing documents on a computer file system utilizing a file system-independent key for use in an index-less VoiceXML browser caching mechanism.

2. Description of the Related Art

In typical web-based programming models, resources, such as a document or a group of documents, are referenced by a Universal Resource Identifier (URI). However, the format of the URI does not always allow it to be easily used as a key for the identification and retrieval of documents on a traditional file system. In particular, there is often a discrepancy between the character values that are supported in the URI and the character values supported by the file system. Therefore, the global use of the URI as a key for a resource in a file system is not an optimal solution. The prior art has not adequately addressed the challenge of building an index-less key-to-resource solution that takes into account differences between the character value requirements supported by the URI and character value requirements in different operating systems.

Therefore, the challenge has become to leverage a file system's built-in ability to index a file quickly. Typically, a file-look up mechanism locates a file quickly because it has a built-in index system within the file system as part of the file system's native operating system. The key-to-resource look-up process is traditionally accomplished by building a higher-level index upon the process that permits the use of a variety of characters, and this higher-level index is used to find the file name on the file system. Thus, the URI is used to first look in a table that contains a variety of characters that could be in the key, and then the file on the file system is located. However, this process adds an unwanted level of indirection that should be avoided in order to leverage the file system directly. Table structure formats like those used in the prior art place a great burden on the system's memory and result in an inefficient document storage/retrieval system.

It is therefore desirable to have a method and system that uses a key for the identification and storage of documents in a traditional file system where the key is used as the file name, where multiple levels of indirection are eliminated and where the key-to-resource look-up process is portable across all file systems.

SUMMARY OF THE INVENTION

The present invention addresses the deficiencies in the art with respect to data storage and access in an index-less caching mechanism and provides a novel and non-obvious method and system for creating a file system-independent key where the key-to-resource look-up process is portable across all file systems.

Methods consistent with the present invention provide a method of constructing a system-independent key from a universal resource indicator for use in an index-less caching system. The index-less caching system could be, for example, a Web browser or a VoiceXML browser. The method includes converting characters of the universal resource indicator to equivalent values resulting in a value string having a value string length, the value string including a file name entry associated with a cached resource. The equivalent values could be alphanumeric values, for example, hexadecimal values. The method then determines if the value string length exceeds a predetermined maximum file entry length for the caching system, and, if the length is exceeded, converts the value string into discrete file entries including one or more directory entries and the file name entry associated with the cached resource. Each discrete file entry contains a number of values equal to or less than the maximum file entry length.

Systems consistent with the present invention include a system for constructing a system-independent key from a universal resource indicator for use in an index-less caching system. The index-less caching system could be, for example, a Web browser or a VoiceXML browser. The system comprises a computer having a database, the database storing a cached resource, the location of the cached resource identified by a universal resource indicator. The system further includes a central processing unit that converts characters of the universal resource indicator to equivalent values resulting in a value string having a value string length, where the value string includes a file name entry associated with a cached resource. The equivalent values could be alphanumeric values, for example, hexadecimal values. The central processing unit further determines if the value string length exceeds a maximum file entry length for the caching system, and, if the length is exceeded, converts the value string into discrete file entries including one or more directory entries and the file name associated with the cached resource, wherein each discrete file entry contains a number of values equal to or less than the maximum file entry length.

In accordance with still another aspect, the present invention provides a computer-readable storage medium storing a computer program which when executed performs a method of constructing a system-independent key from a universal resource indicator for use in an index-less caching system. The index-less caching system could be, for example, a Web browser or a VoiceXML browser. The computing method includes converting characters of the universal resource indicator to equivalent values resulting in a value string having a value string length, where the value string includes a file name entry associated with a cached resource. The equivalent values could be alphanumeric values, for example, hexadecimal values. The method then determines if the value string length exceeds a predetermined maximum file entry length for the caching system, and, if the length is exceeded, converts the value string into discrete file entries including one or more directory entries and the file name associated with the cached resource. Each discrete file entry contains a number of values equal to or less than the maximum file entry length.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method and system for storing resources on a computer file system using a Universal Resource Indicator (URI) as the file name by generating a unique system-independent key from the URI for use in an index-less browser caching system. The invention takes into account the various file entry length limitations enforced by each unique file system by converting the specified URI into a key containing hexadecimal equivalent values of the key's characters. In this fashion, a VoiceXML caching mechanism can be created that is file system-independent.

Figure 1:
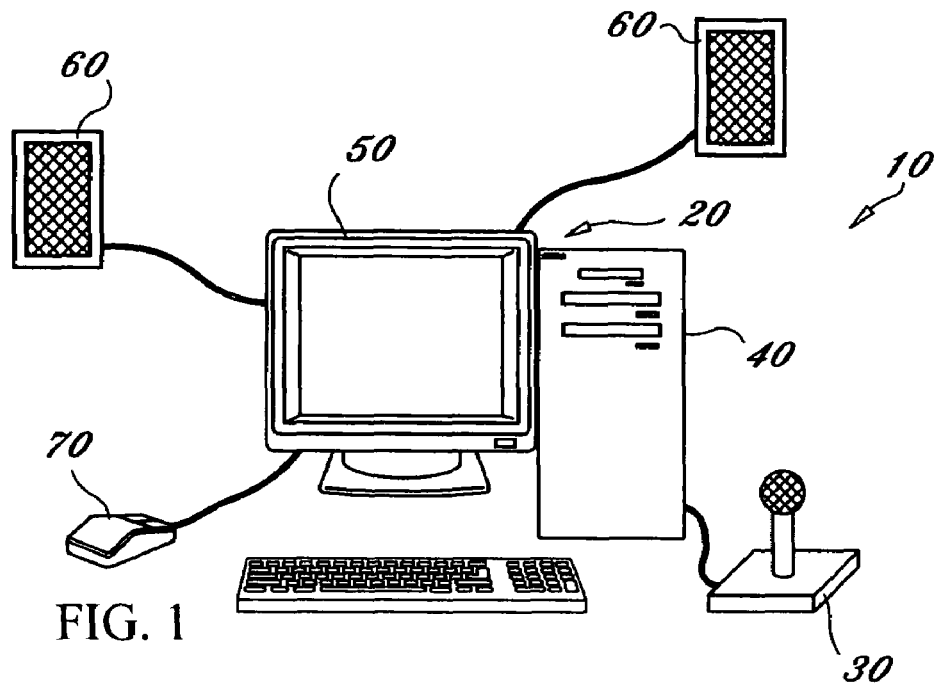
FIG. 1 is an illustration of a computer system for a speech recognition system incorporating the method and system of the present invention.

FIG. 1 shows a typical computer system 10 for use in conjunction with the present invention. The system is preferably comprised of a computer 20 including a database and a central processing unit (CPU) 40, one or more memory devices, and associated circuitry. The system may also include a microphone 30 operatively connected to the computer system through suitable interface circuitry or a "sound board" (not shown), and at least one user interface display unit 50 such as a video data terminal (VDT) operatively connected thereto. The CPU can be comprised of any suitable microprocessor or other electronic processing unit, as is well known to those skilled in the art. Speakers 60 as well as an interface device, such as mouse 70 can also be provided with the system, but are not necessary for operation of the invention as described herein.

An index-less caching mechanism is utilized in order to facilitate high performance sharing of cached resources across processes and networks, while supporting multiple concurrent access of cached resources. A WebSphere Voice Server 4.2 VoiceXML browser, for example, utilizes an index-less caching mechanism in an Interactive Voice Response (IVR) system. The index-less caching mechanism provides a file system file entry name as the key for a URI of the cached resource. The index-less caching mechanism allows the resolution of cached resources without the overhead and platform dependencies associated with an external database management system.

Figure 2:
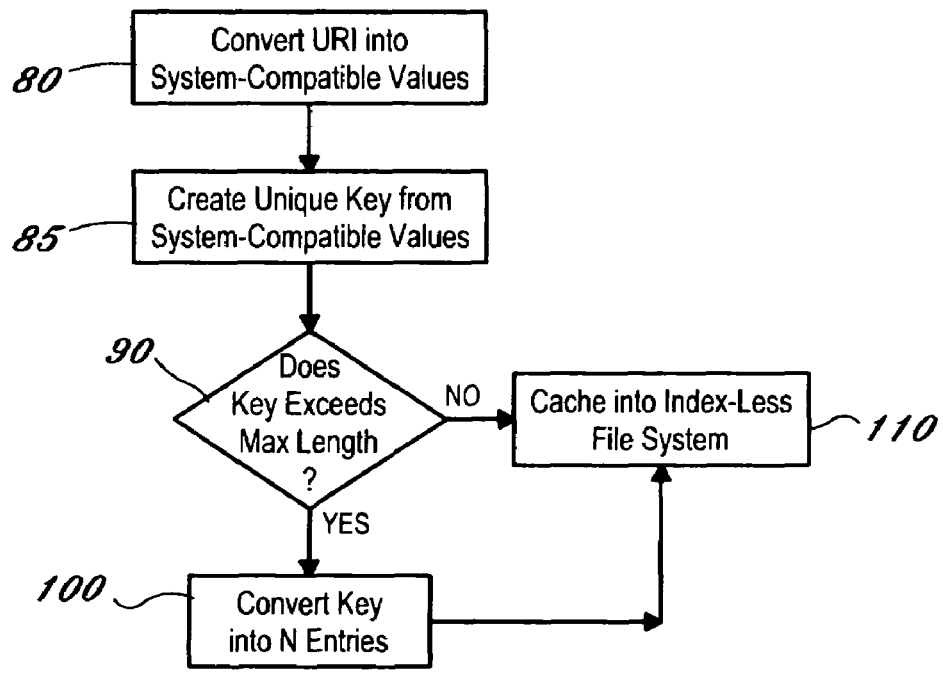
FIG. 2 is a flowchart illustrating the method of converting a URI into a file system-independent key in an index-less VoiceXML browser caching system.

Referring to FIG. 2, the process of generating a unique, file system-independent key from a URI for use in an index-less caching mechanism is shown. The initial step in the process is to convert the URI into a unique key. URIs may contain many characters. For example, a Uniform Resource Locator (URL), which is a URI in a web-based system, can contain as many as 50 characters or more. Many of these characters are not compatible with many file systems. Colons, back slashes, and other characters may not be recognizable in certain file systems. The system of the present invention searches for the lowest common level of file characters across all file systems in order to utilize characters that are recognizable. Therefore, whether using Mac®, Windows®, Unix®, or any other operating system, the common characters are an alphanumeric system, e.g. the English alphabet and the numbers in the numerical system.

Hexadecimal characters are alphanumeric characters that are compatible with all operating systems. It is within the scope of the invention to provide other transformation algorithms that will transform the URI characters to other uniform file name entries, other than hexadecimal characters. The motivation is to transform the characters of the URI into equivalent file name entries that can be recognized by all file systems. The remaining discussion will assume that hexadecimal characters are used.

The first step in the process presented by the present invention is to convert the URI into system-compatible values, e.g. represented in hexadecimal form (step 80). A unique key can then be created from these hexadecimal values (step 85). In this fashion, a streamlined file-retrieval process can be created for use across all file systems. Yet even with the use of a hexadecimal key, file name lengths that each file system is capable of supporting may be different. For example, in a Windows platform utilizing a FAT32 File Allocation Table or an NT file system (NTFS), the character limit for a file name is 1024 characters. However, on Advanced Interactive Executive (AIX) platforms utilizing Journaled File Systems (JFS), the default character limit for a file name is 255 characters as defined as the NAME_MAX variable. Because a URI can be quite long, as in the case of a URL, the present invention generates a key in the lowest common denominator in terms of the file name capabilities, i.e. the characters that are permitted, and advantageously limits the file name length to account for variances in maximum file names across different platforms to provide a portable, index-less solution.

Therefore, after converting the URI into a hexadecimal equivalent key, the system must then determine if the key exceeds the maximum file entry length for the system. This is accomplished by step 90 in the process illustrated in FIG. 2. If the maximum character length is exceeded, the key must be converted into discrete entries (step 100). In either case, after the process of converting the URI to a key of hexadecimal characters is completed, the final step is to cache the resource into the index-less file system (step 110).

A typical VoiceXML browser caching mechanism consists of file system entries representing cached resources. In the caching system utilizing the present invention, the file system entries have file name values corresponding to the hexadecimal values of the URI for each cached resource. The requirements for creating and maintaining a separate index file for retrieval queries is eliminated, and performance is maximized. By representing the file system key for a URI in hexadecimal format and then storing the key as a series of file system directory entries including a single file system file entry corresponding to the cached resource, file system independence is achieved.

Figure 3:
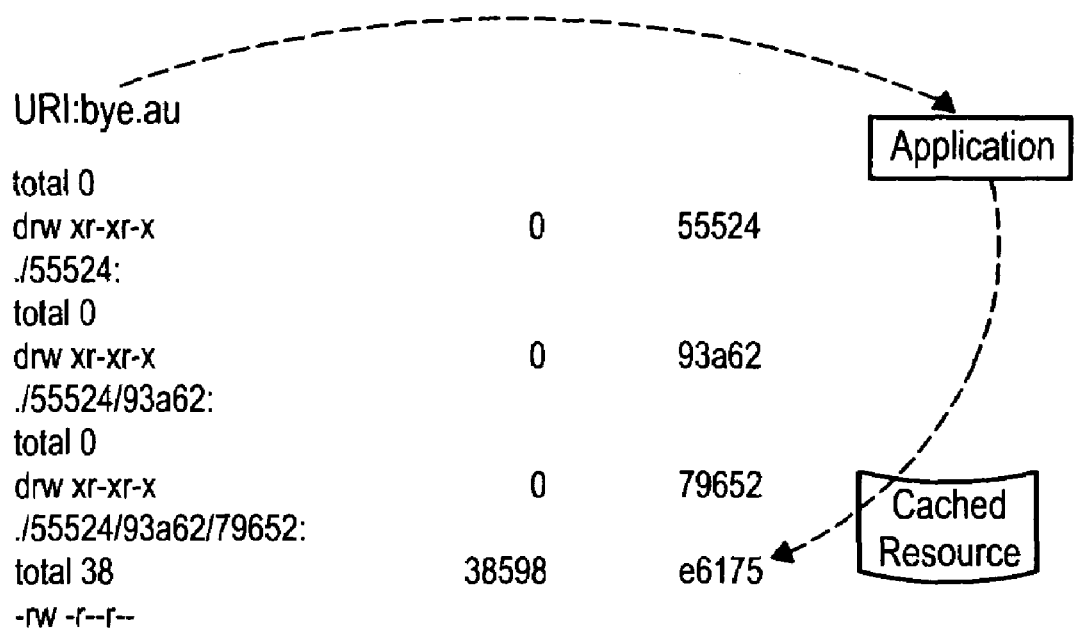
FIG. 3 is a diagram illustrating the application of the present invention on a VoiceXML caching system.

An example is shown in FIG. 3 to illustrate this process. FIG. 3 shows an example of the key-generation process of the present invention. A URI, for example, "bye.au" is shown. The system converts the specified URI into a key that is represented by the hexadecimal values of the URI characters. Therefore, the hexadecimal equivalent of each URI character is: 5552493a6279652e6175. The system then checks to see if the converted file name exceeds the configured maximum file entry length, and if so, separates the value string into a series of recursive directory and file entries less than or equal to the maximum file entry length. In this example, the URI converted key is given a configured maximum file entry length of 5. Since maximum file entry length for the system key is exceeded, the system must separate the hexadecimal entries into discrete file system directory entries, and a single file system file entry. The directory entries refer to the address where the cached resource is located, and the file entry refers to the name of the file where the cached resource is located. The system then creates a unique file system entry pointer for the cache mechanism based upon the maximum file entry length configured (5). If the file entry algorithm determines that an entry exists on the file system having the same combination of recursive directory and file entries, a valid file pointer is returned. The file pointer is based on a series of recursive file system directory entries and a single file system entry in the most enclosing recursive sub directory that represents the cached resource. Therefore, the re-configured URI converted key becomes: /55524/93a62/79652/e6175. In this case, blocks /55524/, /93a62/, and /79652/ refer to discrete directories indicating where the cached resource is located and the file system entry /e6175/ contains the file name associated with the cached resource. The result is a series of directories containing the URI-converted key, in a format (hexadecimal) that is compatible with all operating systems and configured to be within any file length constraints that may be imposed by those operating systems.

The system and method of the present invention provide a data storage and retrieval system that accounts for variations in various system platform constraints. The system stores documents in a file system by using the URI as the file name. It does this by transforming the URI into a stream of characters that are recognized across all file system platforms, for example, hexadecimal characters. It further takes into account file name character limits of different file systems by separating the character stream into discrete value segments that can be stored in separate directories. The system and method of the invention is applicable in any cache management system including web browsers and VoiceXML browsers.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of constructing a system-independent key from a universal resource indicator for use in an index-less caching system, the method comprising:
    converting, in an index-less caching mechanism executing in memory by a processor of a computer, characters of the universal resource indicator to equivalent values resulting in a value string having a value string length, the value string including a file name associated with a cached resource;
    determining by the index-less caching mechanism if the value string length exceeds a predetermined maximum file entry length for the caching system; and
    converting by the index-less caching mechanism the value string into discrete file entries including one or more directory entries and the file name associated with the cached resource, wherein each discrete file entry contains a number of values equal to or less than the maximum file entry length.

2. The method of claim 1 wherein the index-less caching system is a Web browser.

3. The method of claim 1 wherein the index-less caching system is a VoiceXML browser.

4. The method of claim 1 wherein the equivalent values are alphanumeric values.

5. The method of claim 4 wherein the alphanumeric values are hexadecimal values.

6. A machine readable storage medium storing a computer program which when executed constructs a system-independent key from a universal resource indicator for use in an index-less caching system, the computer program performing a method comprising:
    converting characters of the universal resource indicator to equivalent values resulting in a value string having a value string length, the value string including a file name associated with a cached resource;
    determining if the value string length exceeds a predetermined maximum file entry length for the caching system; and
    converting the value string into discrete file entries including one or more directory entries and the file name associated with the cached resource, wherein each discrete file entry contains a number of values equal to or less than the maximum file entry length.

7. The machine readable storage medium of claim 6, wherein the index-less caching system is a Web browser.

8. The machine readable storage medium of claim 6, wherein the index-less caching system is a VoiceXML browser.

9. The machine readable storage medium of claim 6, wherein the equivalent values are alphanumeric values.

10. The machine readable storage medium of claim 9, wherein the alphanumeric values are hexadecimal values.

11. A system for constructing a system-independent key from a universal resource indicator for use in an index-less caching system, the system comprising a computer having:
    a database, the database storing a cached resource, the location of the cached resource identified by a universal resource indicator; and
    a computer with a memory and a central processing unit coupled to the database, converting characters of the universal resource indicator to equivalent values resulting in a value string having a value string length, the value string including a file name associated with a cached resource, the central processing unit further determining if the value string length exceeds a maximum file entry length for the caching system, and converting the value string into discrete file entries including one or more directory entries and the file name associated with the cached resource, wherein each discrete file entry contains a number of values equal to or less than the maximum file entry length.

12. The system of claim 11, wherein the index-less caching system is a Web browser.

13. The system of claim 11, wherein the index-less caching system is a VoiceXML browser.

14. The system of claim 11, wherein the equivalent values are alphanumeric values.

15. The system of claim 14, wherein the alphanumeric values are hexadecimal values.

* * * * *